(12) United States Patent
Ketter et al.

(10) Patent No.: US 7,462,225 B1
(45) Date of Patent: Dec. 9, 2008

(54) GAS SEPARATOR AGITATOR ASSEMBLY

(75) Inventors: Chris Ketter, Edmond, OK (US); Raymond E. Floyd, Oklahoma City, OK (US); Chengbao Wang, Oklahoma City, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 638 days.

(21) Appl. No.: 11/166,451

(22) Filed: Jun. 23, 2005

Related U.S. Application Data

(60) Provisional application No. 60/609,735, filed on Sep. 15, 2004.

(51) Int. Cl.
 *B01D 19/00* (2006.01)
(52) U.S. Cl. .......... 96/217; 95/261; 166/105.5; 166/265; 366/265; 366/342; 366/330.1
(58) Field of Classification Search .......... 95/261; 96/217, 196, 214; 166/105.5, 265, 105.6, 166/105.1; 366/265, 342, 343, 263, 295, 366/325.3, 330.1, 325.92
See application file for complete search history.

(56) References Cited

U.S. PATENT DOCUMENTS

| | | | |
|---|---|---|---|
| 1,700,928 A | 2/1929 | Fawkes | |
| 2,197,539 A | 4/1940 | Hickman | |
| 2,318,141 A * | 5/1943 | Collins | 366/145 |
| 3,972,352 A * | 8/1976 | Bunnelle | 138/42 |
| 4,231,767 A | 11/1980 | Acker | |
| 4,366,861 A | 1/1983 | Milam | |
| 4,378,290 A | 3/1983 | Kennedy, Jr. | |
| 4,481,020 A * | 11/1984 | Lee et al. | 96/214 |
| 4,828,036 A | 5/1989 | Simmons | |
| 4,886,530 A * | 12/1989 | Dussourd | 96/217 |
| 4,901,413 A | 2/1990 | Cotherman et al. | |
| 4,913,630 A | 4/1990 | Cotherman et al. | |
| 4,981,175 A | 1/1991 | Powers | |
| 5,173,022 A | 12/1992 | Sango | |
| 5,207,810 A | 5/1993 | Sheth | |
| 5,431,228 A | 7/1995 | Weingarten et al. | |
| 5,456,837 A | 10/1995 | Peachey | |
| 5,482,117 A | 1/1996 | Kolpak et al. | |
| 5,525,146 A | 6/1996 | Straub | |
| 5,570,744 A | 11/1996 | Weingarten et al. | |
| 5,634,963 A | 6/1997 | Strasser et al. | |
| 5,653,286 A | 8/1997 | McCoy et al. | |
| 5,888,053 A | 3/1999 | Kobayashi et al. | |
| 5,902,378 A | 5/1999 | Obrejanu | |
| 6,066,193 A * | 5/2000 | Lee | 95/261 |
| 6,113,675 A | 9/2000 | Branstetter | |
| 6,131,655 A | 10/2000 | Shaw | |
| 6,155,345 A * | 12/2000 | Lee et al. | 166/105.5 |
| 6,189,613 B1 | 2/2001 | Chachula et al. | |
| 6,382,317 B1 | 5/2002 | Cobb | |

(Continued)

*Primary Examiner*—Robert A Hopkins
*Assistant Examiner*—Douglas J Theisen
(74) *Attorney, Agent, or Firm*—Crowe & Dunlevy, P.C.; David M. Sullivan

(57) ABSTRACT

An agitator assembly for use in a gas separator includes a central hub and at least one blade affixed to the central hub. The blade includes a leading end, a trailing end, a first curved portion adjacent to the leading end and a second curved portion adjacent to the trailing end. In a particularly preferred embodiment, the first and second curved portions are substantially parabolic and have foci on opposite sides of the blade.

20 Claims, 7 Drawing Sheets

U.S. PATENT DOCUMENTS

| | | |
|---|---|---|
| 6,494,258 B1 | 12/2002 | Weingarten |
| 6,702,027 B2 | 3/2004 | Olson et al. |
| 6,705,402 B2 | 3/2004 | Proctor |
| 6,723,158 B2 | 4/2004 | Brown et al. |
| 6,761,215 B2 | 7/2004 | Morrison et al. |
| 6,860,921 B2 | 3/2005 | Hopper |

* cited by examiner

GAS SEPARATOR AGITATOR ASSEMBLY

RELATED APPLICATIONS

The present application claims the benefit of U.S. Provisional Patent Application No. 60/609,735, filed Sep. 15, 2004, entitled, "Gas Separator Blade Design," the disclosure of which is incorporated herein.

FIELD OF THE INVENTION

This invention relates generally to the field of downhole pumping systems, and more particularly to gas separators for separating gas from well fluid prior to pumping.

BACKGROUND

Submersible pumping systems are often deployed into wells to recover petroleum fluids from subterranean reservoirs. Typically, a submersible pumping system includes a number of components, including an electric motor coupled to one or more pump assemblies. Production tubing is connected to the pump assemblies to deliver the wellbore fluids from the subterranean reservoir to a storage facility on the surface.

The wellbore fluids often contain a combination of liquids and gases. Because most downhole pumping equipment is primarily designed to recover liquids, excess amounts of gas in the wellbore fluid can present problems for downhole equipment. For example, the centrifugal forces exerted by downhole turbomachinery tends to separate gas from liquid, thereby increasing the chances of cavitation or vapor lock.

Gas separators have been used to remove gas before the wellbore fluids enter the pump. In operation, wellbore fluid is drawn into the gas separator through an intake. A lift generator provides additional lift to move the wellbore fluid into an agitator. The agitator is typically configured as a rotary paddle that imparts centrifugal force to the wellbore fluid. As the wellbore fluid passes through the agitator, heavier components, such as oil and water, are carried to the outer edge of the agitator blade, while lighter components, such as gas, remain close to the center of the agitator. In this way, modern gas separators take advantage of the relative difference in specific gravities between the various components of the two-phase wellbore fluid to separate gas from liquid. Once separated, the liquid can be directed to the pump assembly and the gas vented from the gas separator.

As shown in FIG. 1, prior art agitators typically include several straight blades 10 connected to a central hub 12. This agitator design is disclosed in U.S. Pat. No. 4,913,630 issued Apr. 3, 1990 to Cotherman, et al., U.S. Pat. No. 5,207,810 issued May 4, 1993 to Sheth and U.S. Pat. No. 4,901,413 issued Feb. 20, 1990 to Cotherman et al. Similar paddle designs are shown in U.S. Pat. No. 4,481,020 issued Nov. 6, 1984 to Lee et al. and U.S. Pat. No. 4,231,767 issued Nov. 4, 1980 to Acker. Despite the acceptance of this design, there are a number of drawbacks presented by the use of straight-blade agitator paddles. For example, straight-blade paddles tend to create significant turbulence in the fluid leaving the agitator. Straight-blade paddles also increase the load placed on the motor driving the gas separator.

There is therefore a continued need for an improved agitator design that more effectively and efficiently separates liquids from gases in a pumping system. It is to these and other deficiencies in the prior art that the present invention is directed.

SUMMARY OF THE INVENTION

In a preferred embodiment, the present invention includes an agitator assembly for use in a gas separator. The agitator assembly preferably includes a central hub and at least one blade affixed to the central hub. The blade includes a leading end, a trailing end, a first curved portion adjacent to the leading end and a second curved portion adjacent to the trailing end. In a particularly preferred embodiment, the first and second curved portions are substantially parabolic and have foci on opposite sides of the blade.

DETAILED DESCRIPTION OF THE PREFERRED EMBODIMENT

Figure 1:
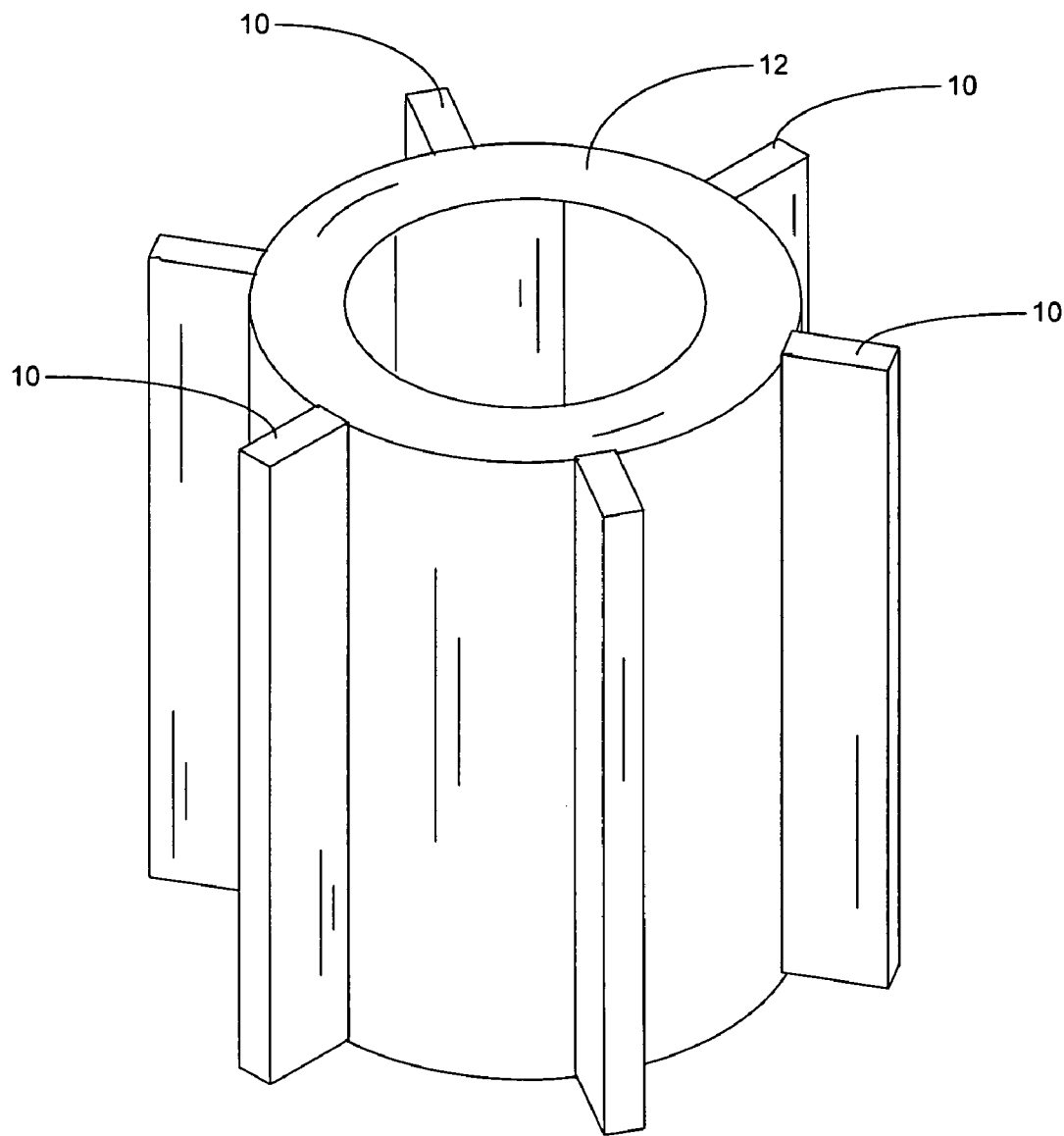
FIG. 1 is a side perspective view of a PRIOR ART agitator assembly.
Figure 2:
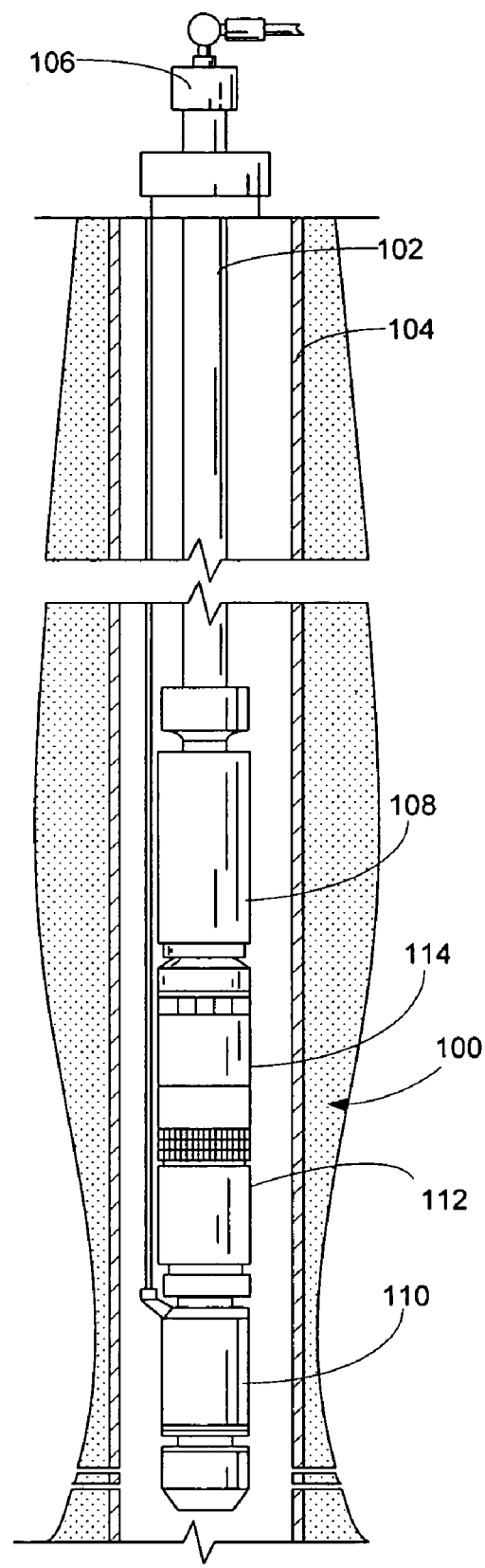
FIG. 2 is elevational view of a downhole pumping system constructed in accordance with a preferred embodiment.

In accordance with a preferred embodiment of the present invention, FIG. 2 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110, a seal section 112 and a gas separator 114. The seal section 112 shields the motor assembly 110 from mechanical thrust produced by the pump assembly 108 and provides for the expansion of motor lubricants during operation. The gas separator 114 is preferably connected between the seal section 112 and the pump assembly 108. During use, wellbore fluids are drawn into the gas separator 114 where some fraction of the gas component is separated and returned to the wellbore 104. The de-gassed wellbore fluid is then passed from the gas separator 114 to the pump assembly 108 for delivery to the surface through the production tubing 102. Although only one of each component is shown, it will be understood that more can be connected when appropriate. For example, in many applications, it is desirable to use tandem-motor combinations, multiple gas separators, multiple seal sections and multiple pump assemblies.

Figure 3:
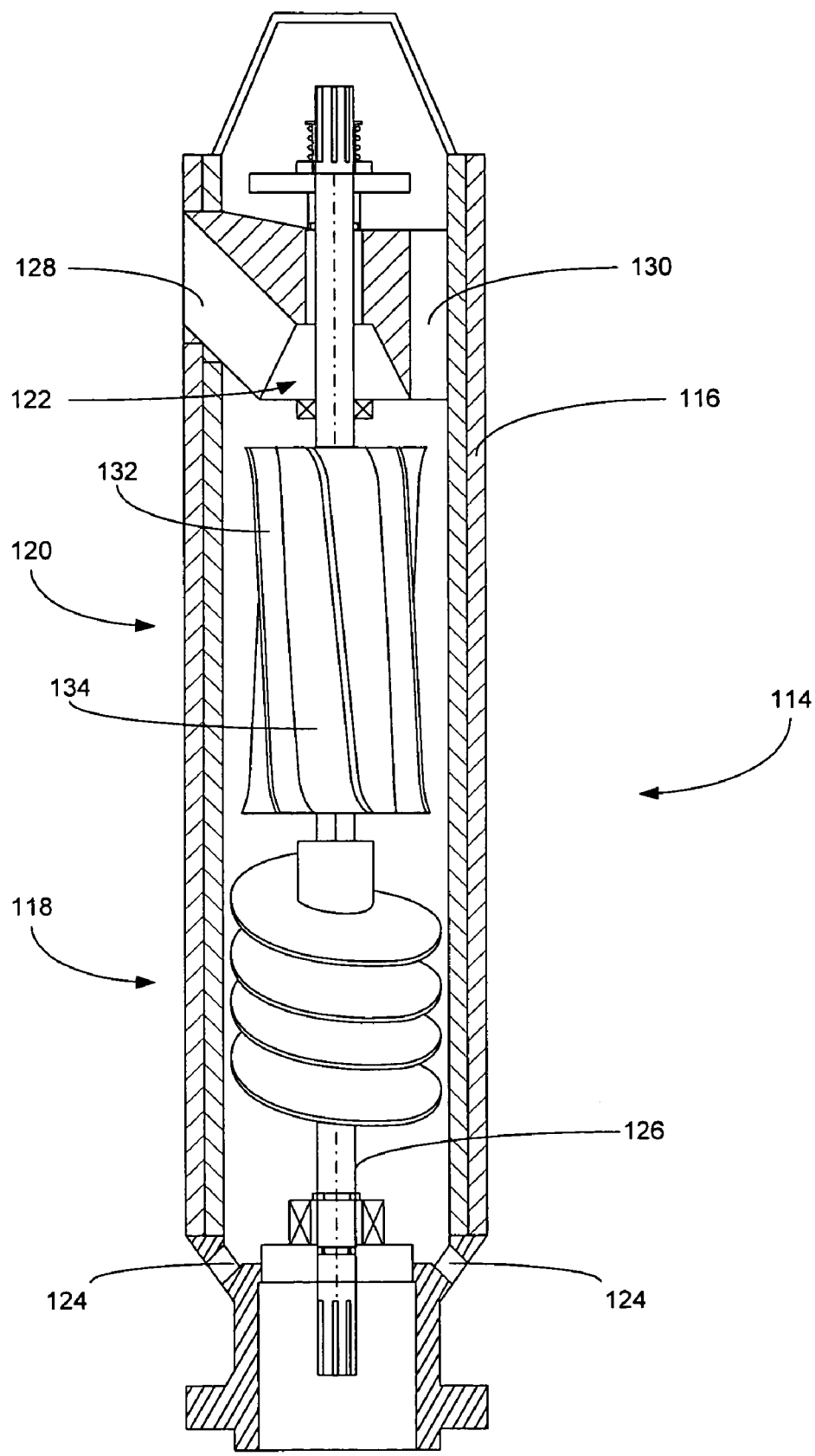
FIG. 3 is a partial cross-sectional view of a gas separator constructed in accordance with a preferred embodiment.

Turning now to FIG. 3, shown therein is a partial cross-sectional view of the gas separator 114. The gas separator 114 preferably includes a housing 116, a lift generator 118, an agitator assembly 120, a crossover 122, inlet ports 124 and a shaft 126. The housing 116 and crossover 122 are shown in cross-section to better illustrate the agitator assembly 120 and lift generator 118.

In the presently preferred embodiment, the lift generator 118 is a configured as a positive-displacement, screw-type pump that moves wellbore fluids from the inlet ports 124 to the agitator assembly 120. The lift generator 118 is connected to the shaft 126 and provided mechanical energy from the motor 110. The crossover 122 preferably includes a gas vent 128 and a liquid port 130. The crossover 122 is preferably configured to gather and remove gas from the gas separator 114 through the gas vent 128. The crossover 122 collects liquid from an outer diameter of the gas separator 114 and directs the liquid through the liquid port 130 to the downstream pump assembly 108.

Figure 4:
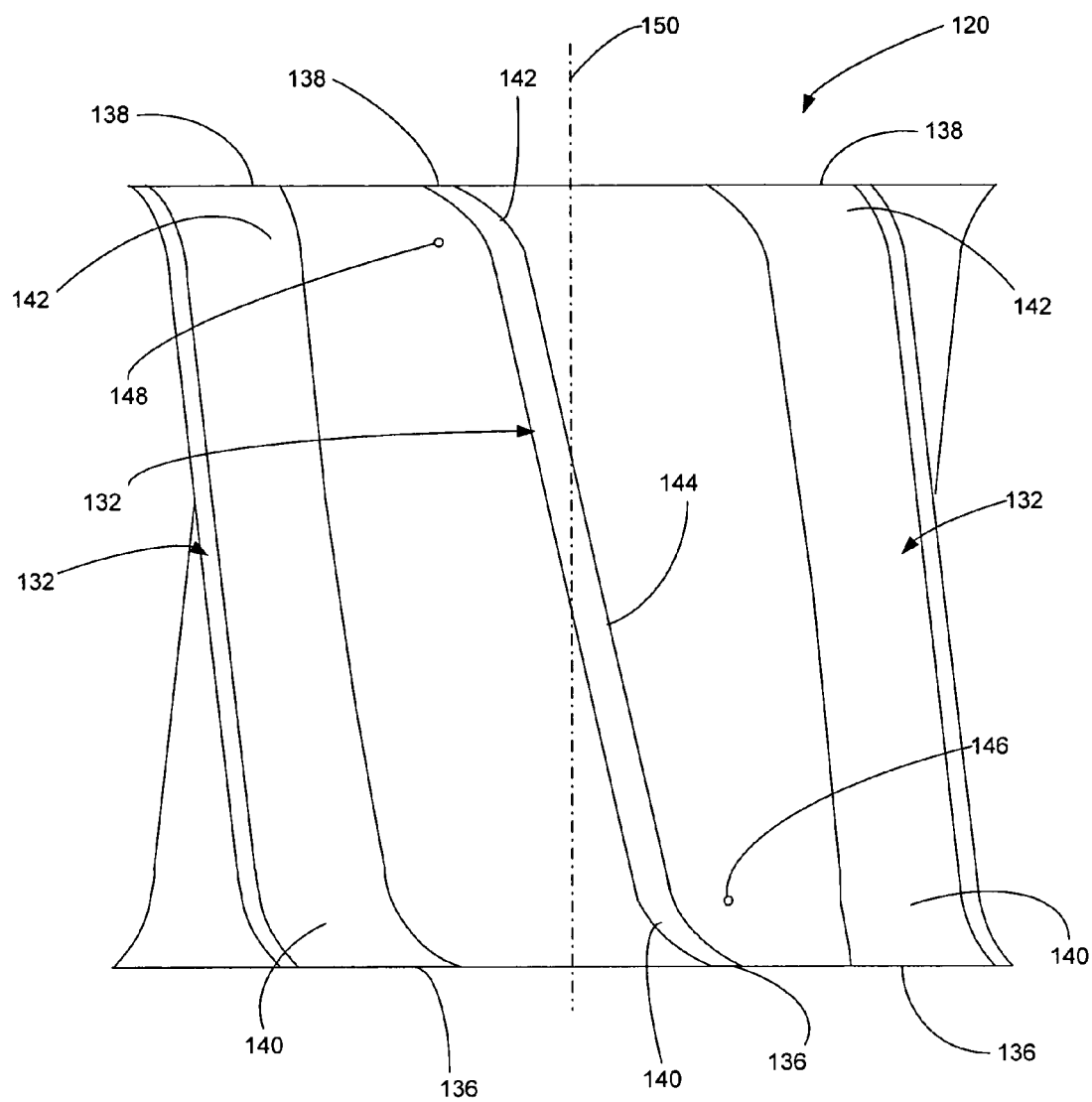
FIG. 4 is a side view of the agitator assembly of the gas separator of FIG. 3.
Figure 5:
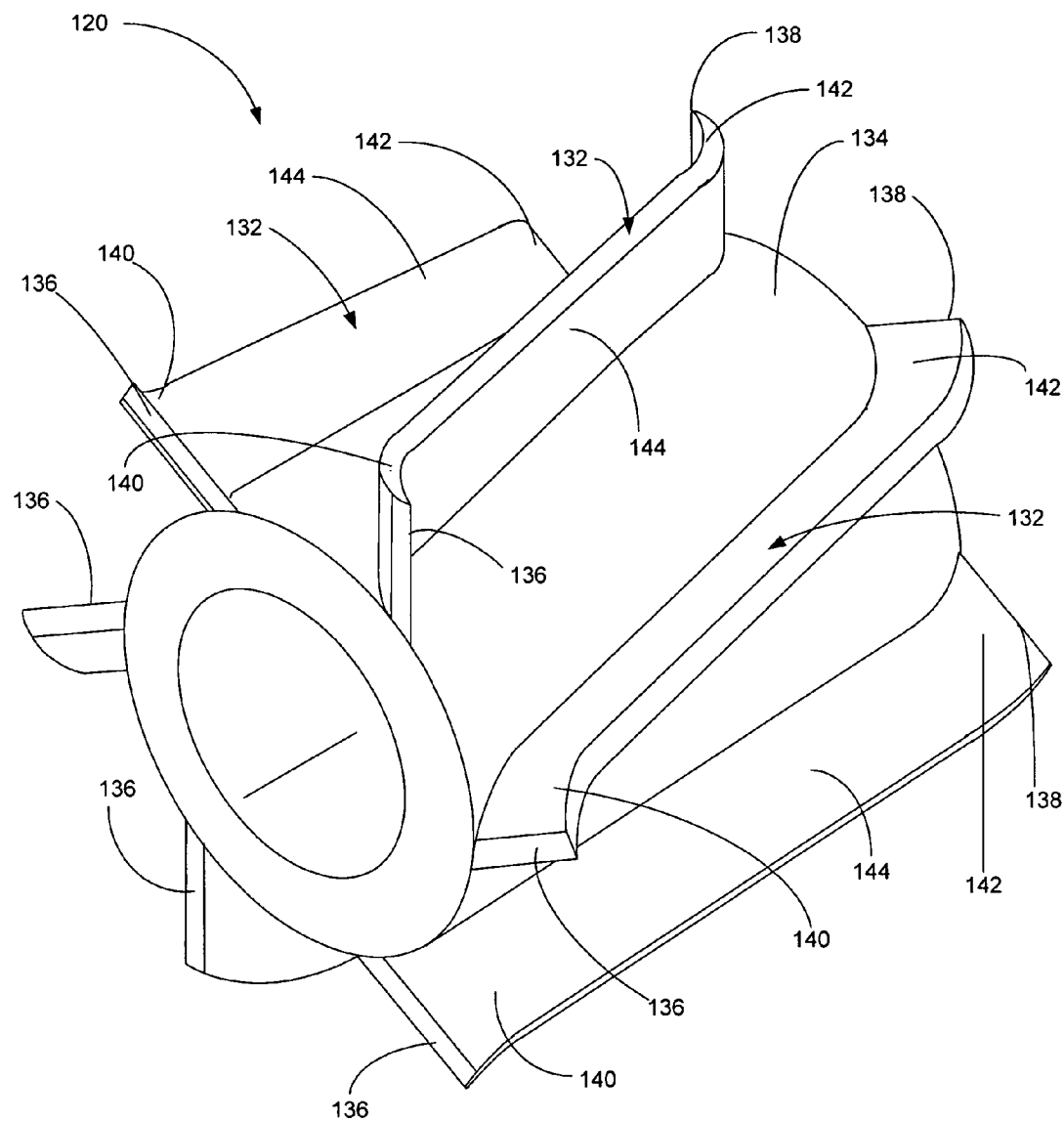
FIG. 5 is a front perspective view of the agitator assembly of the gas separator of FIG. 4.

Referring now also to FIGS. 4 and 5, shown therein are front elevational and front perspective views, respectively, of a first preferred embodiment of the agitator assembly 120. The agitator assembly 120 is connected to the shaft 126 and configured for rotation along the longitudinal axis of the shaft 126. In the first preferred embodiment, the agitator assembly 120 is affixed to the shaft 126 by a keyed connection or other known methodology. In the presently preferred embodiment, the agitator assembly 120 includes a plurality of curved blades 132 and a central hub 134. The blades 132 and hub 134 are preferably die-cast or machined using a suitable metal, such as steel. It will be appreciated that the blades 132 and hub 134 may be fabricated as integral parts or as separate parts joined together. Although six blades 132 are shown on the agitator assemblies 120 in FIGS. 4-7, it will be understood that fewer or greater numbers of blades 132 could also be used.

As most clearly shown in FIG. 4, the agitator blades 132 preferably each include a leading end 136, a trailing end 138 and at least two curved portions therebetween. In the particularly preferred embodiment shown in FIG. 4, each blade 132 includes a first curved portion 140 and a second curved portion 142 connected by a straight or substantially linear middle portion 144. The first curved portion 140 is adjacent the leading end 136 and the second curved portion 142 is adjacent the trailing end 138. In the first preferred embodiment shown in FIGS. 4 and 5, the first and second curved portions 140, 142 are substantially parabolic with foci 146, 148, respectively, on opposite sides of the blade 132.

In the first preferred embodiment, the linear portion 144 is angularly offset with respect to a longitudinal axis 150 of the hub 134. In a particularly preferred embodiment, the blade 132 is offset from about twenty-five (25) to about forty-five (45) degrees from the longitudinal axis 150. The degree of angular offset can be adjusted to accommodate the requirements of specific environments or applications.

Figure 6:
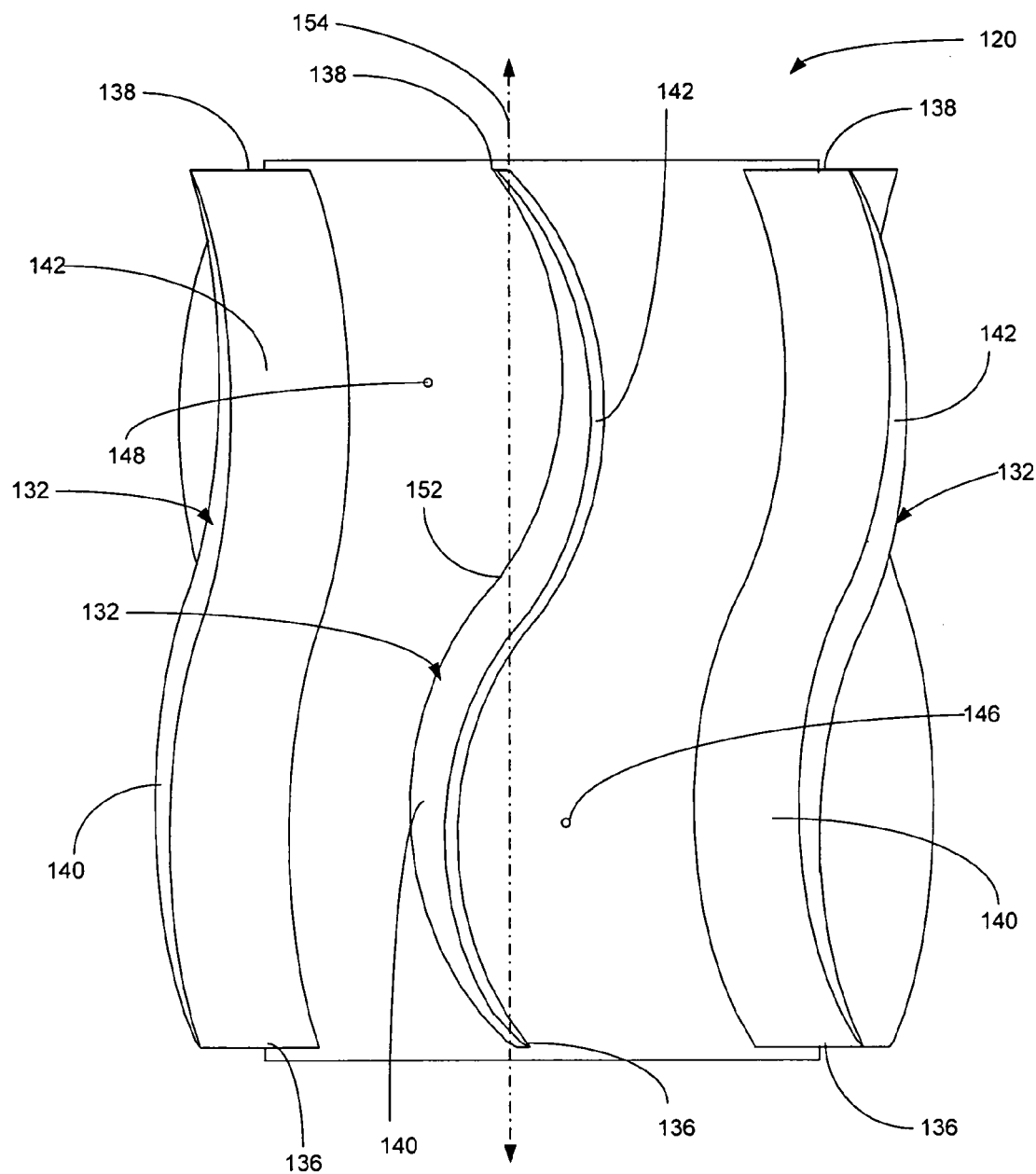
FIG. 6 is a side view of an alternate preferred embodiment of an agitator assembly.
Figure 7:
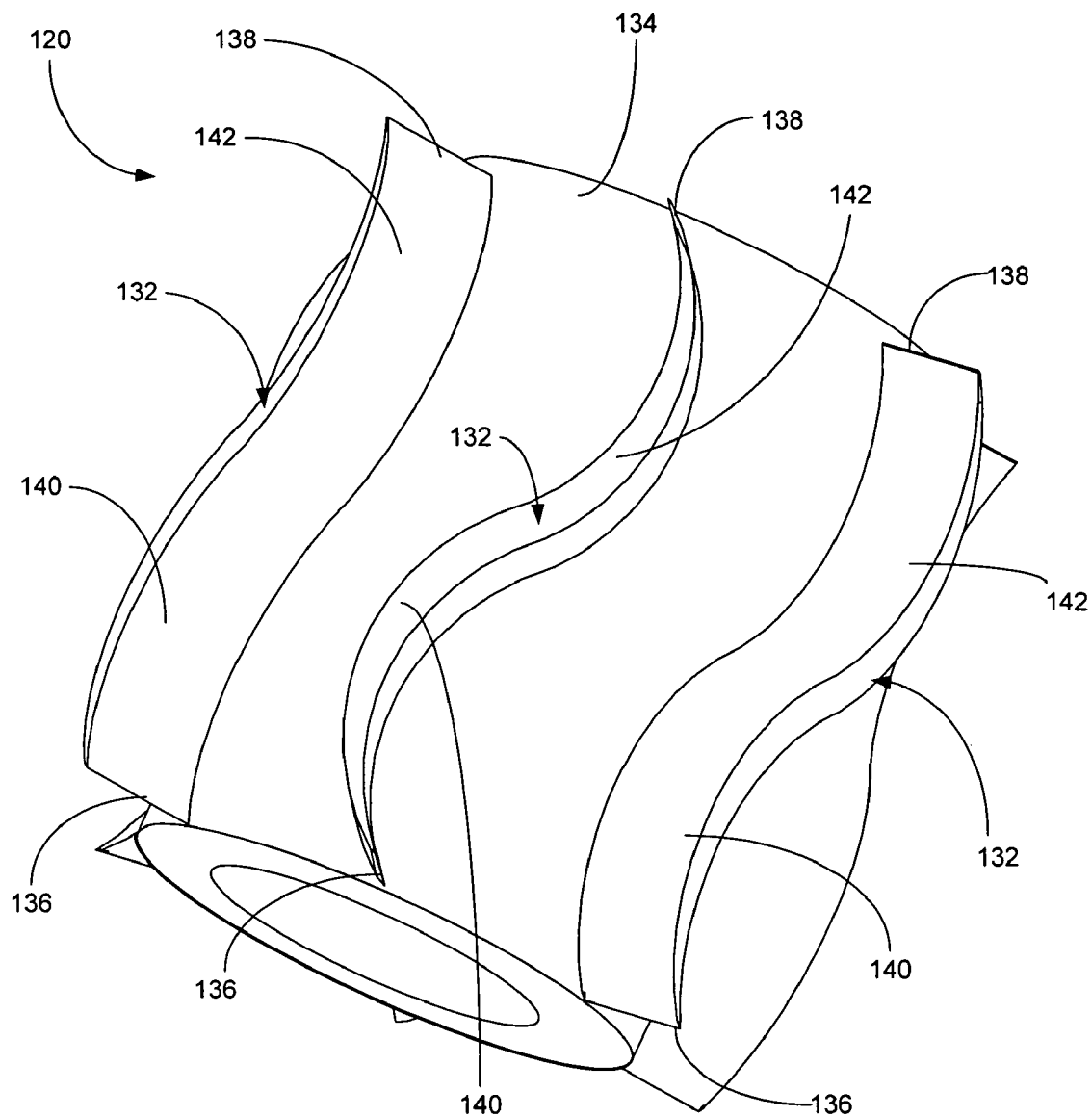
FIG. 7 is a front perspective view of the agitator assembly of the gas separator of FIG. 6.

Turning to FIGS. 6 and 7, shown therein is a second preferred embodiment of the agitator assembly 120. The agitator blades 132 preferably each include a leading end 136, a trailing end 138 and at least two curved portions therebetween. In the second preferred embodiment shown in FIG. 6, each blade 132 includes a first curved portion 140 and a second curved portion 142 that adjoin at an inflection point 152. The first curved portion 140 is adjacent the leading end 136 and the second curved portion 142 is adjacent the trailing end 138. In the second preferred embodiment shown in FIGS. 6 and 7, the first and second curved portions 140, 142 are substantially parabolic with foci 146, 148, respectively, on opposite sides of the blade 132. In this way, the blade 132 presents a substantially "backward-S" shape. Furthermore, the curved portions 140, 142 are configured such that the leading end 136 and trailing end 138 are on opposite sides of a centerline 154 that intersects the center of mass of the blade 132 and extends parallel to the longitudinal axis 150 of the hub 134.

In both the first and second preferred embodiments, the first curved portion 140 is oriented to draw fluid into the agitator assembly 120 while the agitator assembly 120 is rotating in a clockwise direction (when viewed from the bottom of the gas separator 114). The first curved portion 140 of the blade 132 adjacent the leading end 136 decreases turbulence caused by the movement of the agitator assembly 120 through the fluid. The second curved portion 142 is oriented to expel fluid from the agitator assembly 120 with minimal turbulence. In this way, the first and second curved portions 140, 142 provide smooth transitions for the wellbore fluid entering and exiting the agitator assembly 120, thereby reducing turbulence and decreasing back-pressure on the lift generator 118. Additionally, the curved blade 132 has a comparatively larger surface area than straight-blade designs, which increases contact time with the wellbore fluid and improves the efficiency of the liquid-gas separation. It will be understood to one of skill in the art that the orientation of the blades 132 could be reversed for use in an agitator assembly that rotates in a counter-clockwise direction. It is contemplated that two or more agitator assemblies 120 could be used in the gas separator 114. In certain applications, it may be desirable to employ a combination of several agitator assemblies 120 constructed in accordance with both the first and second preferred embodiments disclosed above.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An agitator assembly for use in a gas separator;
the agitator assembly comprising:
   a central hub; and
   a blade affixed to the central hub; wherein the blade includes:
      a leading end;
      a trailing end;
      a first curved portion adjacent to the leading end; a second curved portion adjacent to the trailing end, and
      wherein the first curved portion and the second curved portion are substantially parabolic and where the foci for the first and second curved portions are on opposite sides of the blade.

2. The agitator assembly of claim 1, wherein the blade further comprises a linear middle portion between the first curved portion and the second curved portion.

3. The agitator assembly of claim 1, wherein the first curved portion and second curved portion adjoin at an inflection point.

4. The agitator assembly of claim 1, wherein the blade is configured as a substantially "backward-S" shape.

5. The agitator assembly of claim 1, wherein the blade further comprises a centerline that intersects the center of mass of the blade and extends substantially parallel with the longitudinal axis of the hub and wherein the leading end and the trailing end are on opposite sides of the centerline.

6. A gas separator comprising:
   a lift generator; and
   an agitator assembly having a plurality of blades, wherein each of the blades includes a first curved portion and a second curved portion.

7. The gas separator of claim 6, wherein the agitator assembly further comprises a central hub, and wherein the plurality of blades are connected to the central hub.

8. The gas separator of claim 6, wherein each of the plurality of blades further includes:
   a leading end; and
   a trailing end.

9. The gas separator of claim 8, wherein the first curved portion and second curved portion adjoin at an inflection point.

10. The gas separator of claim 9, wherein the first curved portion and the second curved portion are substantially parabolic and where the foci for the first and second curved portions are on opposite sides of the blade.

11. The gas separator of claim 10, wherein the blade is configured as a substantially "Backward-S" shape.

12. The gas separator of claim 11, wherein the blade further comprises a centerline that intersects the center of mass of the blade and extends substantially parallel with the longitudinal axis of the hub.

13. The gas separator of claim 12, wherein the leading end and the trailing end are on opposite sides of the centerline.

14. A pumping system comprising:
   a pump assembly;
   a motor configured to drive the pump assembly; and
   a gas separator connected to the pump assembly, wherein the gas separator includes:
      a lift inducer; and
      an agitator assembly having a plurality of blades, wherein each of the blades includes a first curved portion and a second curved portion.

15. The pumping system of claim 14, wherein the agitator assembly further comprises a central hub, and wherein the plurality of blades are connected to the central hub.

16. The pumping system of claim 15, wherein each of the plurality of blades further includes:
   a leading end; and
   a trailing end.

17. The pumping system of claim 16, wherein the first curved portion and second curved portion adjoin at an inflection point.

18. The pumping system of claim 17, wherein the first curved portion and the second curved portion are substantially parabolic and where the foci for the first and second curved portions are on opposite sides of the blade.

19. The pumping system of claim 18, wherein the blade is configured as a substantially "backward-S" shape.

20. The pumping system of claim 19, wherein the blade further comprises a centerline that intersects the center of mass of the blade and extends substantially parallel with the longitudinal axis of the hub and wherein the leading end and the trailing end are on opposite sides of the centerline.

* * * * *